United States Patent

McDonald et al.

[11] 4,011,019
[45] Mar. 8, 1977

[54] ADJUSTABLE AND DISENGAGABLE EARTH RAISE BORER STEM

[75] Inventors: Michael C. McDonald, Auburn; Charles R. Dively, Seattle, both of Wash.

[73] Assignee: Ingersoll-Rand Company, Woodcliff Lake, N.J.

[22] Filed: Jan. 16, 1976

[21] Appl. No.: 649,850

[52] U.S. Cl. .................. 403/15; 403/334; 175/53; 403/360
[51] Int. Cl.² .................. F16D 1/00; F16L 17/00; F16L 29/00
[58] Field of Search ........... 403/31, 247, 250, 263, 403/262, 361, 360, 333, 334, 15; 173/163; 175/53; 64/1 R

[56] References Cited
UNITED STATES PATENTS

| | | | |
|---|---|---|---|
| 141,018 | 7/1873 | Sparks | 403/334 X |
| 2,931,659 | 4/1960 | Novkov | 403/334 X |
| 3,430,461 | 3/1969 | Boylan | 403/262 X |
| 3,698,750 | 10/1972 | Eastcott et al. | 403/31 X |
| 3,724,239 | 4/1973 | Callstrat | 64/13 |
| 3,917,009 | 11/1975 | Dyer et al. | 175/53 |

*Primary Examiner*—Wayne L. Shedd
*Attorney, Agent, or Firm*—Bernard J. Murphy

[57] ABSTRACT

The arrangement comprises an earth raise borer stem which is formed with a tapered surface, near one terminal end thereof, for slidably engaging and forming an interference fit with a similarly tapered collar within the center of a cutterhead. The stem further has, at the lowermost end thereof, according to one embodiment, a bolted-on flange plate which has a series of rectangular cutouts formed therein. The cutouts receive lugs which are also bolted onto a lowermost surface of the cutterhead. The cooperating tapered surfaces of the collar and the stem cooperate to react thrust and torque which is impressed through the stem to the cutterhead and the cutout flange plate impresses rotary torque onto the cutterhead by means of the lugs. The arrangement provides a simple and facile arrangement for replaceably coupling a stem and cutterhead. Coupling bolts are employed to insure and retain the interference fit, and also (by means not shown) can further be employed, as jacking bolts, to facilitate disassembly of the stem from the cutterhead. The cooperating tapered surfaces include an annular channel which has a conduit opening thereonto for the supply of hydraulic fluid under pressure to enable a break out or disassembly of the stem and cutterhead.

12 Claims, 4 Drawing Figures

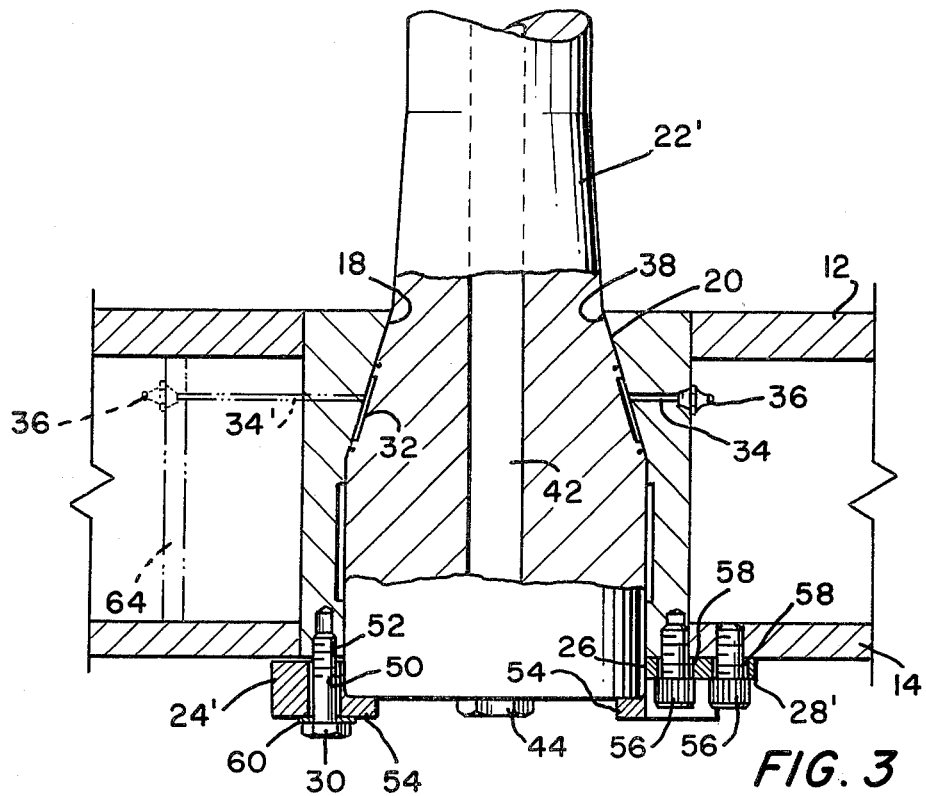
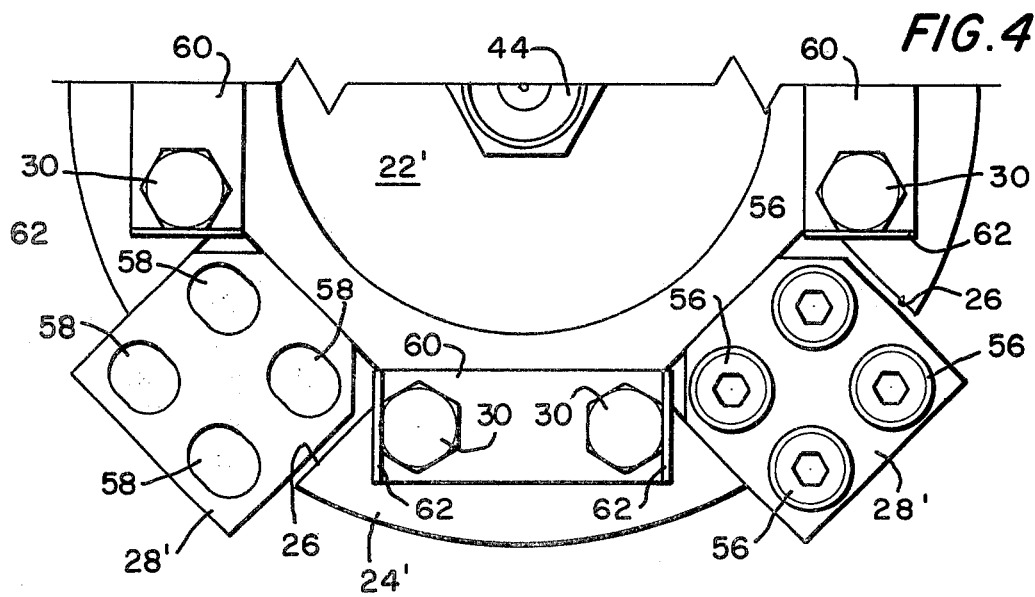

ADJUSTABLE AND DISENGAGABLE EARTH RAISE BORER STEM

This invention pertains to earth raise boring heads and in particular to an arrangement replaceably coupling the stem of an earth raise boring head to the cutterhead thereof.

Raise boring heads are used to enlarge connecting pilot bores formed between underground tunnels, or between an earth surface and an underlying tunnel, and commonly it is difficult, because of space limitations, to accommodate an entire raise borer reaming head within a tunnel. That is, it is far simpler to be able to transport the cutterheaad, alone, along the tunnel, and meet the stem for the cutterhead, for intercoupling of the two, as the stem is passed through the pilot bore or through a tunnel. For this reason, at least, there has been a long-felt need for raise boring heads which have removable or replaceable stems and, therefore, efficient stemcoupling means are in demand. Additionally, coupling means for raise boring head stems can simplify and otherwise enhance tunnelling operations as, thereby, a fractured or otherwise worn stem can be replaced in position without the entire cutterhead having to be removed.

It is, therefore, an object of this invention to set forth an arrangement replaceably coupling the stem of an earth raise borer to the cutterhead thereof. Especially is it an object of this invention to disclose an arrangement replaceably coupling the stem of an earth raise borer to the cutterhead thereof, comprising first and second surfaces formed in said stem and cutterhead, respectively, which cooperate to define a slidingly-engageable fit therebetween, to effect a mutual coupling engagement of said stem and cutterhead; and means for engaging both said stem and cutterhead for fastening said stem and cutterhead together, retentively, in such an interference-fit coupling arrangement.

Further objects of this invention, as well as the novel features thereof, will become more apparent by reference to the following description taken in conjunction with the accompanying Figures in which.

Figure 1:
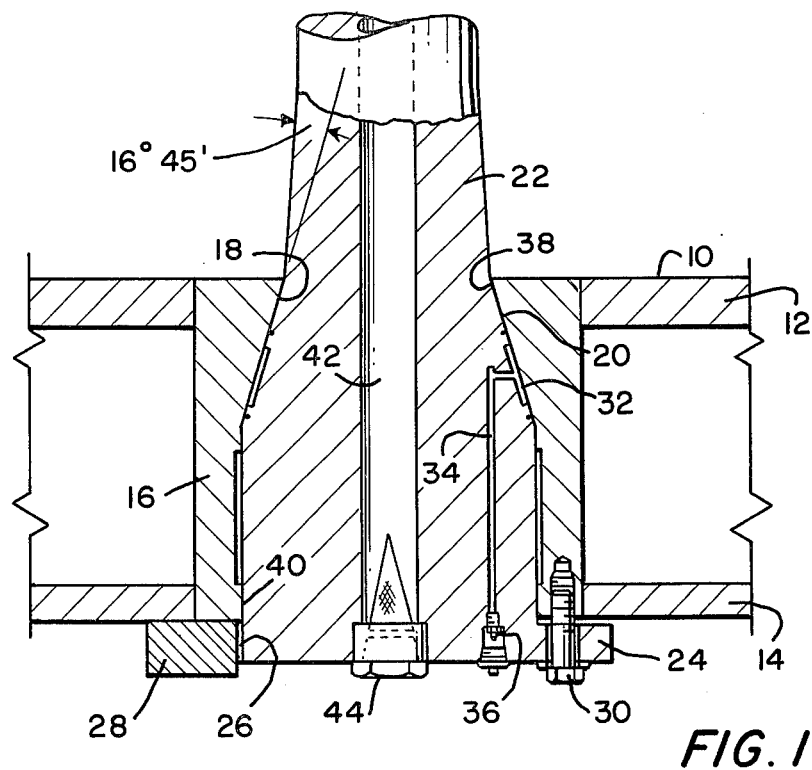
FIG. 1 is a cross-sectional view of an embodiment of the invention taken along Section 1—1 of FIG. 2.
Figure 2:
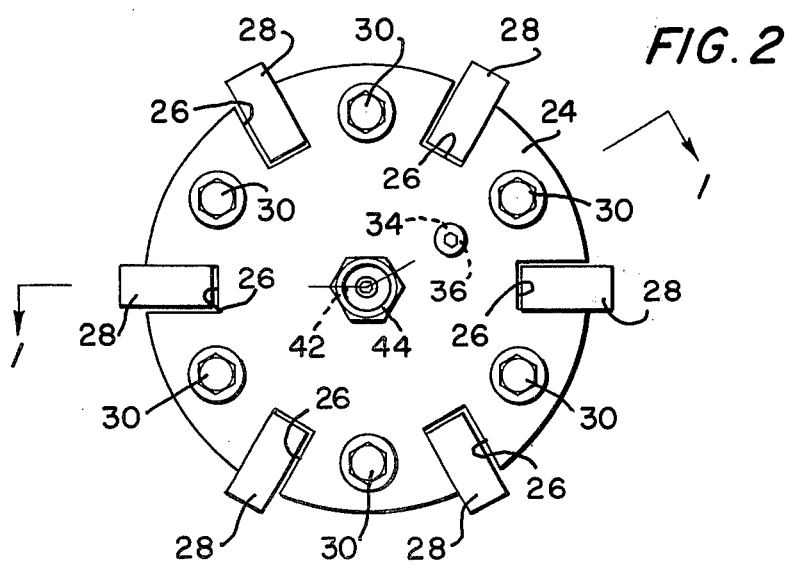
FIG. 2 is a bottom view of the embodiment of FIG. 1.

FIG. 3 is a cross-sectional view, in elevation of an alternative embodiment of the invention; and FIG. 4 is a half of a bottom view of the FIG. 3 embodiment which, however, is enlarged over the scale of FIG. 3. As shown in FIGS. 1 and 2, wherein a first embodiment is depicted, a fragment of a cutterhead 10 (the remainder being omitted for purposes of clarity) has a pair of flat plates or weldments 12 and 14 coupled in spaced-apart disposition by means of a collar 16. The collar has a tapered inner surface 18 which slidably receives a like tapered surface 20 of a stem 22 (shown only in part) to define an interference fit therebetween. At the lowermost end of the stem 22 is formed a flange 24 which has a series of equally spaced slots or rectangular cutouts 26 formed in the periphery thereof; these intimately and slidably receive a like plurality of lugs 28 which are welded to an underlying surface of the cutterhead. On assembly, the stem 22 is placed in the cutterhead 10, through the lowermost portion thereof, in order that the cooperating tapered surfaces 18 and 20 will engage and form an interference fit. To insure and also to secure the fit, a series of locking bolts 30 mutually engage both the cutterhead 10 and the flange 24.

The tapered surfaces, which lie at approximately sixteen degrees off parallelism with the axis of stem 22, transmit thrust force from the stem 22 to the cutterhead 10, and the rectangular cutouts 26 and lugs 28 react rotary torque which is transmitted through the stem to the cutterhead.

To enable separation of the cutterhead 10 from the stem 22 a hydraulic break-out pocket or channel 32 is formed midway along the tapered surface 20 of the stem. A conduit 34 having a fitting 36 at an exposed end thereof opens onto the channel 32 in order that hydraulic fluid under pressure can be supplied to the channel to enable separation. By means (not shown, but) well known to those skilled in the art, the locking bolts 30 are employed in other threaded holes (not depicted) formed in the flange 24 to bear upon plate or weldment 14 to force a separation of the cutterhead 10 and stem 22, in cooperation with the hydraulic fluid.

The stem 22 and cutterhead 10 each have first and second diameter portions which, respectively, define intimate engaging interfaces where indicated (FIG. 1) by index numbers 38 and 40. Therebetween are located the tapered surfaces 18 and 20. The contacting or engaging interfaces 38 and 40 cooperate to insure a straight alignment of the stem 22 and cutterhead 10 while surfaces 18 and 20, on the stem 22 and cutterhead 10, are closing upon each other. The locking bolts 30 cause the flange 24 and the plate or weldment 14 also to close upon each other and to insure and secure the interference fit.

The stem 22 has a central bore 42 interrupted at the lowermost end thereof by a screen-protected spray nozzle 44. The latter is provided for discharging therethrough a conical spray of liquid for dust suppression purposes.

An alternative embodiment of the invention is illustrated in FIGS. 3 and 4 where same or like index numbers are used to denote structural components which are the same as or similar to correspondingly index-numbered components in the FIGS. 1 and 2 embodiment.

In this alternative embodiment, the stem 22' has no integral flange; too, it has no conduit formed therein, with a terminal fitting, to open onto the pocket or channel 32. Alternatively, however, conduit 34 is formed in and through the collar 16, and seats the fitting 36 therein at the outer terminal end thereof. Thus, fitting 36 is shielded by weldments 12 and 14.

In lieu of an integral flange on stem 22', an annular flange plate 24' is employed. Plate 24' has four pairs of bolt holes 50 formed therein, the pairs being equi-angularly spaced apart about the plate. The pairs of bolt holes have corresponding tapped bolt holes 52, formed in the underlying surface of the cutterhead 10, with which to align and conjointly therewith to receive the locking bolts 30. Flange plate 24' has an inwardly extending annular lip 54 which receives thereon the lowermost end of stem 22'.

Also, in lieu of welded-on lugs, for engaging flange cut-outs, this embodiment sets forth the use of replaceable and adjustable lugs 28'. The latter are provided, as are lugs 28 of the first embodiment, for engaging the sides of rectangular cut-outs 26. Such cut-outs are formed in flange plate 24'. However, this alternative lug and cut-out arrangement offers some more facile use. Each lug 28' is bored through to receive the shanks of four socket-head cap screws 56, and the bore holes 58 are oversized. Accordingly, on disposing the lugs 28' in the cut-outs 26 of the flange plate 24', and installing the cap screws 56 in the bore holes 58 (and corresponding tapped holes 60 in the cutterhead 10) the lugs are movably adjustable. The lugs 28' can be displaced, within the generous tolerance provided by oversized holes 58, to effect a sure contacting engagement thereof with a side wall of corresponding cut-outs 26, and then the cap screws 56 can be made fast. This "displaceability" of the lugs 28' accommodates for any marked disparity in tolerances and alignments of components.

As shown in FIG. 4, the locking bolts 30 are passed through lock-tab plates 60, which have pairs of bores therein to receive the bolt shanks. Upon the bolts being torqued in place, terminal ends 62 of the plates are bent up to engage flats of the bolts 30 — to prevent inadvertent loosening of the latter.

Some cutterheads are differently constructed, from that of cutterhead 10 of FIG. 3, having a further, outer wall 64 (shown in phantom). In use of the invention with such other cutterheads, it is necessary to continue conduit 34 with a pipe 34', to connect between collar 16 and wall 64, and install the fitting 36 in the wall 64.

While we have described our invention in connection with a specific embodiment thereof, it is to be clearly understood that this is done only by way of example and not as a limitation to the scope of our invention as set forth in the objects thereof and in the appended claims.

We claim:

1. An arrangement replaceably coupling the stem of an earth raise borer to the cutterhead thereof, comprising:
    first and second surfaces formed on a stem and cutterhead, respectively, which cooperate to define a slidingly-engageable interference fit therebetween, to effect a mutual, coupling engagement of said stem and cutterhead; and
    means for engaging both said stem and cutterhead for fastening said stem and cutterhead together, retentively, in such an interference-fit coupling arrangement; further including
    rotary torque-receiving means carried by one of said stem and cutterhead; and
    rotary torque-transmitting means also carried by one of said stem and cutterhead for contacting engagement with said torque-receiving means for transmitting stem rotary torque to said cutterhead; wherein
    said torque-receiving means comprises a plurality of lugs, each thereof having a lateral, radially disposed surface;
    said torque-transmitting means comprises a like plurality of wall elements, each thereof arranged for contacting engagement with said lateral, radially disposed surface of one of said lugs; and
    said lugs are adjustably displaceable relative to said cutterhead for movement of said lateral, radially disposed surfaces thereof into and out of proximity to said wall elements.

2. An arrangement, according to claim 1, wherein:
said stem is circular in cross-section, having spaced-apart, first and second diameter portions; and
said first surface of said stem is formed intermediate said first and second diameter portions.

3. An arrangement, according to claim 1, wherein:
said cutterhead has a circular bore formed therein, having first and second diameter portions; and
said second surface of said cutterhead is formed intermediate said first and second diameter portions.

4. An arrangement, according to claim 1, wherein:
said cutterhead has a bore formed therein;
said bore is rimmed, at one end thereof, by a weldment;
said stem has an elongate axis; and
said stem has means extending radially of said axis for closing upon and defining an interface with said weldment.

5. An arrangement, according to claim 4, wherein:
said weldment and said radially-extending means are commonly bored for mutually receiving said fastening/engaging means.

6. An arrangement, according to claim 1, wherein:
at least one of said first and second surfaces has a recess formed therein for cooperation with the other of said first and second surfaces to define a pocket therebetween; and
conduit means formed in one of said stem and cutterhead and opening externally thereof, and also opening onto said recess, for charging said recess with fluid under pressure to facilitate an uncoupling and disengagement of said stem and cutterhead.

7. An arrangement, according to claim 6, wherein:
said first and second surfaces are circular and concentric; and
said recess is annular.

8. An arrangement, according to claim 7, wherein:
said first and second surfaces are commonly tapered.

9. An arrangement, according to claim 8, wherein:
said stem has an elongate axis; and
said first and second surfaces are tapered relative to said axis at an acute angle of between 8° and 25°.

10. An arrangement, according to claim 9, wherein:
said angle is at approximately 16° of arc from a line parallel to said axis.

11. An arrangement, according to claim 1, wherein:
said torque-transmitting means comprises a platelike element replaceably secured to at least one of said stem and cutterhead;
said element has recesses formed therein for nesting said lugs therewithin; and
said lugs are replaceably secured to said cutterhead.

12. An arrangement, according to claim 11, wherein:
said element comprises an annulus;
said annulus is secured to said cutterhead, and has an annular lip formed thereon for engaging therewith a terminal end of said stem.

* * * * *